UNITED STATES PATENT OFFICE 2,627,478

DULLED FILM-FORMING COMPOSITION

Howard L. Bewick and Kenneth R. Brown, Chicago, Ill., assignors to The Sherwin-Williams Company, Cleveland, Ohio, a corporation of Ohio No Drawing. Application February 3, 1947, Serial No. 726,222

7 Claims. (Cl. 106—192)

This invention relates to an ingredient of a coating composition, and particularly to a pigmentary part of such composition. More particularly it deals with the use of a zeolite as a component in coating compositions for the purpose of reducing the specular reflection of said coatings when dry in a film, and the production of clear, transparent films possessing the required sheen, and to the products themselves characterized by improved stability with shelf age.

Finishing and/or coating compositions which are more or less matte have been widely used, for they simulate a "rubbed" appearance associated with the highest quality products. This matte appearance has been achieved through a wide selection of addition agents for incorporation in the vehicle binder portion of the coating. Among those that have been used are waxes, soaps, silica, diatomaceous earths and many common non-pigmentary or "inert" pigments.

Materials in prior use suffer from one or more of the following disadvantages: Slight to substantial lack of suspensibility in the package with time, poor water resistance with which they endow the film, inutility for final rubbing and polishing operations, lack of transparency and clarity of the matte coating when dry, difficulty in control of the degree of dullness, fluctuations in viscosity with age, adverse affects upon the drying and/or hardness of the applied coating, solubility in solvents which may contact the film (such as alcohol), contribution to crazing of the film when flexed, and other defects. Further importance found in the agent we propose is that it is readily available in commercial quantities, and as it is a by-product, economic advantages result through its use.

While natural occurring zeolites may be employed, we have found that they have many objectionable features and constitute little, if any, improvement over the general run of inert type pigments heretofore incorporated in varnish vehicles to produce matte finishes.

The synthetic zeolites may be prepared by admixing cold, either dilute solutions of aluminum sulphate with sodium silicate or sodium silicate with sodium aluminate, each solution having a low concentration of from 5 to 10% solids in the required proportions. The temperature is held sufficiently low and the concentration of the solutions of such dilution that the reaction is inhibited for such a time that thorough mixing can take place before the reaction proceeds to the point where gel formation takes place. After thorough agitation the gel does form and agitation should no longer be continued. The product is then removed and dried. In the further processing of the material, that is during the drying, washing, and subsequent grinding, there is a relatively large percentage of "fines" produced which are not desirable as ion exchange media for use in normal water softening equipment.

We have found that these fines can be expediently used as flatting agents in preparing dulled coating compositions after they have been thoroughly washed to remove the water soluble salts such as acidic or alkaline impurities, depending upon the proportions of the reactants, and the method of manufacture used by the maker of the synthetic zeolite.

If the water soluble impurities are not removed the resultant coating composition remains sensitive to moisture and is of diminished value.

We have further found that the washing of the synthetic zeolites with tap water has another important, unexpected result. When the synthetic zeolites are washed, for example, with Chicago tap water, there is an ion exchange within the synthetic zeolite. Some of the sodium ion is replaced with the calcium and magnesium ions from the water. The Chicago water used contains the following:

35 parts per million calcium (as salts)
10 parts per million magnesium (as salts)
3 parts per million sodium (as salts)
1 part per million potassium (as salts)
Below 1 per cent of iron and aluminum
A residue of about 160 parts per million on evaporation.

We have found, as later shown, that this treatment affects markedly the results achieved in the physical characteristics of coating compositions. The progress made in the removal of water soluble salts from the synthetic zeolite fines by washing with water can be observed through the physical changes that occur. In one specific case for example the original pH of the zeolite was found to be 5.9, and after thorough washing shifted to the alkaline side at a pH of about 8.8. In other cases the original material has been found to have an excessively alkaline pH of about 10 which has been reduced by the water washing procedure. The preferred zeolite prepared in the above described manner (herein designated SW-synthetic zeolite) has a refractive index of about 1.48. It has also been observed that the properly washed synthetic zeolites when placed in conductivity water produce less change in the resistance of the conductivity water than poorly washed samples.

We have found by further experiment that a synthetic zeolite prepared by washing the water-soluble salts from the product with distilled water has less desirable characteristics when incorporated into a coating composition than when washed with tap water. While either method of washing would produce a workable flatting agent, we prefer the use of a water having some hardness both from a cost angle and from the improvement in the characteristics of the product when the synthetic zeolite is so derived.

As the quality of the final synthetic zeolite used is related to the washing step, the method we use, while not critical as to the successful use of the zeolite, does give a very satisfactory product. Other methods may be found, or especially prepared "hard waters" could conceivably be used, without departing from the spirit of the use of tap water to remove the water soluble salts from the synthetic zeolite product.

We prefer to start with impure synthetic zeolites having a particle size range below approximately 40 mesh screen.

The following washing procedure is used in preparing SW synthetic zeolite: 1500 pounds of crude synthetic zeolite is processed in a unit. A bed having a circular cross section of approximately six square feet in area is prepared of about eighteen inches in depth. Water is run through the bed at a rate of approximately 0.8 gallon per square foot of cross sectional area per minute and this rate is maintained for from 20 to 40 hours depending upon the many variables. Sulfates are watched in the wash water by periodic barium chloride tests for sulfates as compared to a standard through visual examination (see Scotts Standard Methods of Chemical Analysis, volume I, 5th edition; D. Van Nostrand & Company, 1939, pages 903 et. seq., particularly paragraph 5, page 904). The presence of other water soluble ions towards the end of the washing period can be nicely controlled through electrical conductivity measurements using a conductivity bridge and a standard conductivity water to check samples of the synthetic zeolite for presence of ionizable salts (see Textbook of Physical Chemistry, Glasstone, D. Van Nostrand & Company 1940, pages 870-889). During this washing step, there are the aforementioned ion exchange reactions in which some of the sodium is replaced with calcium and magnesium from the natural hardness of the wash water used. Experimental replacement of the metal ion in the exchangeable position greatly influences the results obtained when the zeolite is incorporated into a vehicle binder or varnish. The following Table I illustrates the divergent effects in a standard varnish formulation where the only variable is the ion in the exchangeable position.

TABLE I

| Replaced Metal Ion in Zeolite | H | Na | Mg | Ca | K | Zn | Ba | SW Synthetic Zeolite |
|---|---|---|---|---|---|---|---|---|
| Body of Base | Thin | Thin | Heavy | Heavy | Heavy | Heavy | Thin | Medium. |
| Viscosity,[1] Gardner-Holdt, After Nine Months' Age. | A | Not Measurable | Not Measurable | do | M | Gelled | Not Measurable | J. |
| Resistance to Water, Test of Dry Film. | Ex | Good | Good | Fair | Fair | Fair | Poor | Fair. |
| Flow Upon Application | Ex | do | V. Good | Poor | do | Good | Ex | V. Good. |
| Settling, After Nine Months | Sep | V. B. Set | Def. Set | Sep | Sep | Gelled | Bad. Set | Sep. |
| Percent Supernatant Fluid After Nine Months' Age. | 90% | 90% | 55% | 20% | 40% | 1% | 95% | 55%. |
| Percent Gardner Gloss @ 60° Angle, Initially. | 78 | 80 | 65 | 35 | 30 | 60 | 85 | 60. |
| Gardner Gloss @ 60° Angle, After Nine Months' Age. | 55 | 65 | 20 | 10 | 10 |  | 80 | 55. |

[1] All were E, viscosity G.-H., to start.
Sep.—separation—easily stirred in.
Set.—settling—hard to stir in.
Ex.—excellent.
V.—very.
V. B.—very bad.

Different results can be achieved by selection of the type of vehicle used, but the above illustration shows the variations that are possible when the exchangeable ion is entirely replaced with ions common to waters that may be used for the washing operation, and clearly illustrates the superiority of the product where there is a mixed replaceable ion, the result from the natural hardness (hard as compared with distilled water) in the water source used in the washing step.

After the washing operation, the wet zeolite may be water ground and dried to between 15% and 20% water content as determined by drying at 120° C., or the zeolite may be first dried and used directly in processing as will be shown in the examples which follow.

As is well known, the quality of the organic binder used in making a dull coating composition influences to a great degree the quality of the finished product, and in using washed synthetic zeolites as a dulling agent we have found no adverse effects upon the film quality—quality being dependent upon the type of organic binder selected. We also find that suspension is outstanding by comparison with other flatting agents, despite the fact that washed synthetic zeolites do not alter the viscosity of the resulting fluid compositions as markedly as other desirable agents heretofore used. Our preferred compositions have exceptional transparence and clarity, both in the fluid state in the container and when applied and dried in their films. Furthermore, as we have been able to use the "fines" (particles below 40 mesh waste from water-softener zeolite manufacture), the cost has been favorable compared with the better quality, operable, inert pigments available.

In formulation of clear, dull finishing compositions, the amount of flatting agent is roughly directly proportional to the degree of gloss desired in the product when applied and dried. That is, the more dull the surface desired, the more agent included. It is a common procedure to grind a large quantity of a flatting agent in a relatively small proportion of the binder chosen to form a flatting paste or base. This paste or base can be further blended with clear binder free of flatting base to give the specular reflection desired by the consumer. From this exposition it is apparent that the percentage of zeolite used is in no way critical within the range of specular reflection required in the film, and that degree of gloss found in popular acceptance and usage. The specular reflection achieved can be modified by both the percentage of zeolite included in the formulation, the length of time of grinding, the proportion of zeolite to vehicle in the grinding operation and in other factors. By control and change of these variables, a wide range of properties can be incorporated into the final product.

The following examples, in which the quantities are given by weight, are illustrative of the practice of the invention.

EXAMPLE I

*Preparation of varnish vehicle "A"*

22½% rosin modified phenol aldehyde resin (e. g., Sherwin-Williams dyphenite V-13133)
22½% China-wood oil (drying oil)
55% mineral spirits (thinner)

Heat the resin and three-fourths of oil to 400° F. until the resin is melted. Raise the temperature to 525° F., hold for 15 to 30 minutes for suitable viscosity. Check with the remaining oil. Cool to 375° F. and thin with mineral spirits.

*Preparation of flatting composition*

The following ingredients were loaded in a jacketed pebble mill and ground:

240 lbs. 40 mesh and under, washed and dried synthetic zeolites
40 lbs. aluminum stearate (suspending agent)
278 lbs. short oil length varnish "A"
241 lbs. petroleum spirits (thinner)

Grinding is continued until a reading on a sample therefrom gave a Hegman gauge reading of between 4M and 4P (see Physical Examination of Paints, Varnishes, Lacquers and Colors, Gardner, 1946 edition, page 277). The product is a semi-flatting paste which can be further reduced with equal amounts of the same or other compatible varnishes. For example, a wanted degree of gloss in the trade is prepared by mixing 83 pounds of the pebble milled base with 150 pounds of the varnish "A" and adding thereto to catalyze the drying of the vehicle ¾ pound 24% lead naphthenate, ¼ pound 6% manganese naphthenate and one pound of 6% cobalt naphthenate. The gloss can be altered by adding more or less varnish or vehicle having a compatible quality at the discretion of the maker.

EXAMPLE II

*Lacquers*

A mixture was prepared from:

15 to 17 lbs. zeolite
5 to 3 lbs. suspending agent (aluminum stearate)
20 lbs. ½" nitrocellulose
3 lbs. butyl acetate
47 lbs. xylol
5 lbs. butyl alcohol
5 lbs. ethyl alcohol The above was ground together in a mill to 3P to 4M on a Hegman gauge. Ten gallons of the resultant lacquer flatting base was added to 90 gallons furniture lacquer to form a lacquer of medium rubbed effect sheen.

EXAMPLE III

*Dull ethyl cellulose coating*

15 to 17 lbs. washed synthetic zeolite
5 to 3 lbs. aluminum stearate
20 lbs. 14 C. P. S. ethyl cellulose
43 lbs. xylol
12 lbs. butyl alcohol The above ingredients are ground together on a pebble mill to form a clear ethyl cellulose solution flatting base. 10 gallons of the base diluted with 90 gallons of clear ethyl cellulose furniture lacquer will produce a coating when applied and dried having a medium rubbed effect sheen.

Other binders in common use as the nonvolatile portion of the vehicle such as various combinations of drying oils and natural or synthetic resins, other modified cellulose derivatives such as ethyl cellulose, and nitrocellulose, and rubber derivatives such as chlorinated rubbers may also be employed with zeolites to produce attractive and useful dull films.

Colored coatings may also be prepared using washed synthetic zeolites to control the degree of gloss in the final product as will be readily apparent to skilled paint formulators.

The term "zeolite" as employed herein is used in its generally accepted sense to describe a group of complex salts of aluminum and silicon with other metals, and which have the property of exchanging the metallic ions with solutions of metallic salts (see Hackh's Chemical Dictionary, 3rd edition, 1944, page 921). The hydrogen zeolites are commonly used to remove anions from water while the sodium or potassium zeolites are commonly used to remove cations, especially calcium and magnesium, from water. The synthetic or artificial zeolites which can be prepared by the reaction of compounds of aluminum and silicon with other metal compounds in the manner previously described are preferred for the purpose of this invention because they are substantially pure and free from contaminants that are present in the naturally occurring zeolites. The synthetic zeolites used also are characterized by the fact that they have approximately the same refractive index as the vehicle in which they are dispersed, which is usually within the range of 1.47 to 1.63.

It will be understood that any water softening zeolite can be employed for the purpose of the present invention regardless of the particle size, but it is especially advantageous for economic reasons as well as for practical utility to employ zeolites of the smaller particle sizes, sometimes referred to as "fines," which are not suitable for use in water softening.

As previously indicated, although a dulling or flatting effect can be obtained with any of the synthetic zeolites (as listed, for example, in Table I), the best results have been obtained with zeolites of metals forming insoluble carbonates as opposed to the zeolites of metals forming soluble carbonates. The alkaline earth metals (e. g., calcium, magnesium) are typical of those forming insoluble carbonates while the alkali metals (e. g., sodium, potassium) are typical of those forming soluble carbonates. As illustrated by Table I, the optimum results have been obtained with a mixed calcium magnesium synthetic zeolite.

The quantity of the zeolite employed will vary depending upon the result desired. It is possible in the practice of the invention to add a relatively small quantity of zeolite which is insufficient to produce a dull film but at the same time is sufficient to reduce the high gloss or shine of a very glossy film. With larger quantities of zeolite dull or flat finishes can be produced. In general, the amount of zeolite employed will be sufficient to produce a film having a specular reflection less than 95% when measured at an angle of 60° by the Gardner method (Physical and Chemical Examination of Paints, Varnishes, Lacquers, and Colors—1946 edition—Gardner—pages 104–106, particularly in reference to the Hunter Visual Glossimeter which is also known as the Gardner 60° Glossimeter). In most cases this is accomplished by employing at least 5% of the synthetic zeolite, but with some types of coating compositions smaller amounts can be used. As will appear from Table I the zeolite employed and the quantity thereof is preferably such as to produce a Gardner gloss at a 60° angle within the range of 30% to 85%.

The terms "varnish," "lacquer," "lacquer solvent," "thinner" and "vehicle" are all herein used in their customary sense, as defined by Hackh's Chemical Dictionary, 3rd edition, 1944.

The flatting compositions of the invention are useful in all amorphous coatings which of themselves have a high specular reflection, including shellac, varnish, lacquer and other coatings.

The examples herein illustrate the use of synthetic zeolites as dulling agents and are not meant to be restrictive of the following claims, for many variations in formulation are apparent from these illustrations.

We claim:

1. A flatting composition comprising essentially a finely divided synthetic alkali metal-calcium-magnesium aluminum silicate substantially free from water soluble salts and a vehicle from the group consisting of varnishes and lacquers.

2. A film-forming coating composition comprising a glossy amorphous hydrophobic film-forming component and a quantity of a finely divided synthetic alkali metal-calcium-magnesium aluminum silicate substantially free from water soluble salts dispersed therein, said quantity being sufficient substantially to reduce the specular reflection of said film in its dried form.

3. A flatting composition comprising essentially a finely divided synthetic sodium-calcium-magnesium aluminum silicate substantially free from water soluble salts and a vehicle from the group consisting of varnishes and lacquers.

4. A film-forming coating composition comprising a glossy amorphous hydrophobic film-forming component and a quantity of a finely divided synthetic sodium-calcium-magnesium aluminum silicate substantially free from water soluble salts dispersed therein, said quantity being sufficient substantially to reduce the specular reflection of said film in its dried form.

5. A clear coating composition comprising a lacquer and a finely divided synthetic essentially sodium-calcium-magnesium aluminum silicate substantially free from water soluble salts dispersed therein.

6. A clear coating composition comprising an ethyl cellulose, at least one compatible lacquer solvent for the ethyl cellulose, and a finely divided synthetic essentially sodium-calcium-magnesium aluminum silicate substantially free from water soluble salts dispersed therein.

7. A clear coating composition comprising a nitrocellulose, at least one compatible solvent therefor, and a synthetic finely divided essentially sodium-calcium-magnesium aluminum silicate substantially free from water soluble salts dispersed therein.

HOWARD L. BEWICK.
KENNETH R. BROWN.

REFERENCES CITED

The following references are of record in the file of this patent:

UNITED STATES PATENTS

| Number | Name | Date |
|---|---|---|
| 2,320,527 | Licata | June 1, 1943 |
| 2,361,515 | Weidlich | Oct. 31, 1944 |

FOREIGN PATENTS

| Number | Country | Date |
|---|---|---|
| 503–349 | Great Britain | Apr. 5, 1939 |
| 897 | Austria | Feb. 10, 1900 |
| 595,233 | Germany | Mar. 26, 1934 |